(12) United States Patent
Xu et al.

(10) Patent No.: US 8,958,764 B1
(45) Date of Patent: Feb. 17, 2015

(54) METHOD AND APPARATUS FOR DETECTING AMPLITUDES AND/OR PHASES OF RECOGNIZABLE SIGNALS IN A FREQUENCY BAND OR SPECTRUM OF INTEREST

(71) Applicant: HRL Laboratories, LLC, Malibu, CA (US)

(72) Inventors: Zhiwei Xu, Los Angeles, CA (US); Donald A. Hitko, Grover Beach, CA (US); Peter Petre, Oak Park, CA (US)

(73) Assignee: HRL Laboratories, LLC, Malibu, CA (US)

( * ) Notice: Subject to any disclaimer, the term of this patent is extended or adjusted under 35 U.S.C. 154(b) by 238 days.

(21) Appl. No.: 13/663,308

(22) Filed: Oct. 29, 2012

(51) Int. Cl.
    *H04B 1/26*     (2006.01)
    *H04B 1/16*     (2006.01)

(52) U.S. Cl.
    CPC .................................... *H04B 1/16* (2013.01)
    USPC ........ 455/196.1; 455/336; 455/334; 455/337; 455/343.1; 455/215

(58) Field of Classification Search
    CPC ............................ G10H 1/0575; G10H 5/002
    USPC ........... 455/196.1, 336, 334, 337, 343.1, 214, 455/215
    See application file for complete search history.

(56) References Cited

U.S. PATENT DOCUMENTS

| | | | | |
|---|---|---|---|---|
| 5,050,167 | A * | 9/1991 | Izadpanah | 370/535 |
| 6,035,177 | A * | 3/2000 | Moses et al. | 725/22 |
| 6,873,838 | B2 | 3/2005 | Mapes | |
| 7,656,931 | B2 * | 2/2010 | Smith et al. | 375/131 |
| 2007/0277006 | A1 * | 11/2007 | Chu et al. | 711/154 |

OTHER PUBLICATIONS

Rapid Signal Classifier (RASCL) Tool of CACI International Inc., of Arlington, VA. See, e.g., www.caci.com/mtl/tools/rascl.shtml.
Manel Martinez Ramon et al., "Signal Classification with an SVM-FFT Approach for Feature Extraction in Cognitive Radio," 2009 SBMO/IEEE MTT-S IMOC, pp. 286-289.
Anna C. Gilbert et al. "Approximation of Functions over Redundant Dictionaries using Coherence", AT&T Labs, Oct. 7, 2002, pp. 243-252.
Joel A. Tropp et al. "Beyond Nyquist: Efficient Sampling of Sparse Bandlimited Signals" IEEE Transactions on Information Theory, vol. 56 No. 1, Jan. 2010, pp. 520-544.

* cited by examiner

*Primary Examiner* — Sanh Phu
(74) *Attorney, Agent, or Firm* — Ladas & Parry

(57) ABSTRACT

A method of and apparatus for detecting signal features including amplitude, phase and timing of recognizable input signals in a frequency band or spectrum of interest. One or more super-regenerative oscillators are provided, each having a center frequency and each detecting signal features of recognizable input signals in the frequency band or spectrum of interest during multiple, successive time slots. The center frequency of each of the one or more super-regenerative oscillators is varied between time slots in a selected sequence, preferably according to a Segmentlet algorithm. The one or more super-regenerative oscillators extract the signal features of each the recognizable input signals in different time slots and/or in different super-regenerative oscillator and with a different time-slot associated center frequency associated with the one or more super-regenerative oscillators, thereby providing a time-frequency-amplitude map of the frequency band or spectrum of interest.

24 Claims, 7 Drawing Sheets

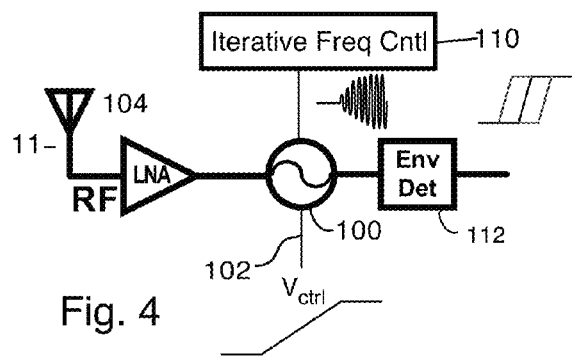
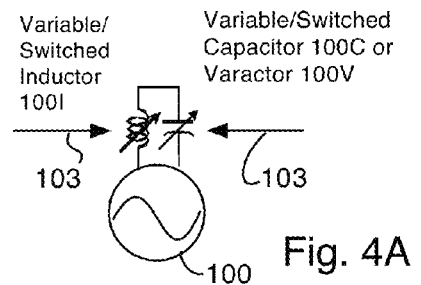
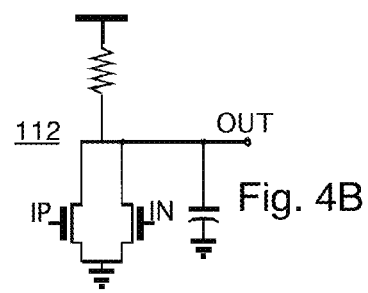
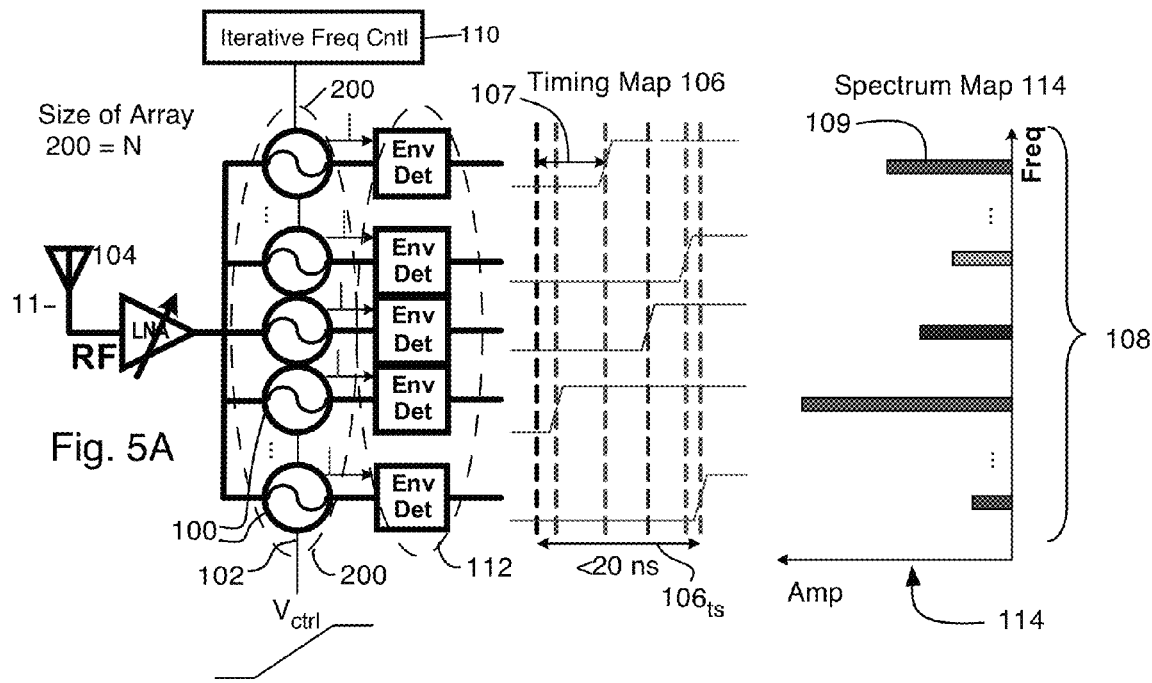

METHOD AND APPARATUS FOR DETECTING AMPLITUDES AND/OR PHASES OF RECOGNIZABLE SIGNALS IN A FREQUENCY BAND OR SPECTRUM OF INTEREST

GOVERNMENT CONTRACT INFORMATION

This invention was made with Government support under Contract Number FA8650-11-C-7158. The Government has certain rights in the invention.

CROSS REFERENCE TO RELATED APPLICATIONS

None.

TECHNICAL FIELD

This invention relates to signal feature extraction and classification, a circuit to signal feature extraction and an architecture for cognitive radio.

BACKGROUND

The prior art of signal classification for both wired and wireless communications make extensive use of digital signal processing. FIG. 1 shows one prior art architecture, described as the Rapid Signal Classifier (RASCL) Tool of CACI International Inc., of Arlington, Va. See, e.g., www.caci.com/mtl/tools/rascl.shtml. RASCL utilizes a RF receiver 10 to demodulate an input signal 11 into an I/Q signal stream. The receiver 10 consists of a low noise amplifier (LNA), down-conversion IQ mixers 12, a phase splitter/shifter element 13 and a synthesizer 16 to generate a Local Oscillator (LO). Then the analog I/Q signals pass through Low Pass Filters (LPFs) 14 and Programmable Gain Amplifiers (PGAs) 18 before being quantized by two high resolution Analog-to-Digital Convertors (ADCs) 22. Signal feature extraction and classification are processed in the digital domain by means of software 24 in a Digital Signal Processor (DSP). Because the RF receiver 10 has no prior knowledge of the received input signals 11, it has to accommodate a large input signal dynamic range (DR). So the high resolution ADCs 22 may need to handle a large dynamic range signal, which is usually more than 14 bits.

FIG. 2 shows an alternative architecture that may reduce the RF receiver complexity and alleviate linearity issues by eliminating down conversion mixers and an analog baseband circuit. Simplification may be achieved at a cost of a higher resolution ADC 26 and require a more sophisticated DSP 24' by moving most of the analog signal processing done in FIG. 1 into the digital domain. Such a system may have more flexibility since much more of the design is dictated by software than by hardware. FIG. 2 also appears a bit like a Software Designed Radio (SDR) which typically has a DSP for signal reception (but not typically for signal feature extraction and classification).

Signal feature extraction and classification involves processing the received signal to acquire the transmitted data symbol, analyzes the receiving signal or signal mixture composed of multiple signals within a common bandwidth, and extracts the associated signal or signal mixture characteristics varying with time, such as carrier frequencies, occupied RF bandwidth, signal strength, modulation types and data symbol rate etc. Signal classification determines the number of signals and signal types in the received signal mixture based upon the acquired signal features, and then separate them into individual signals. Signal classification also attempts to identify the type of received signal from various features of the received signal. The classification, without implying a limitation, may be that the received signal is a Radar signal, an FM radio signal, a Cell phone signal or a combination of these. The features that allow one to classify a signal may be, without implying a limitation, the frequency of the received signal, the signal strength, the phase of the signal or the Energy Timing Map of the received signal.

There has been a design effort reported in prior publications to incorporate Fast Fourier Transforms (FFT) into analog baseband to acquire the incoming signal features in the early stage to assist the following signal classification and relax the RF transceiver, ADC and DSP design requirements. See, Manel Martinez Ramon et al., "Signal Classification with an SVM-FFT Approach for Feature Extraction in Cognitive Radio," 2009 SBMO/IEEE MTT-S IMOC. FIG. 3 shows the suggested architecture. This is different from pure digital approaches, since it utilizes both analog and digital processing to achieve the signal feature extraction and classification and potentially reduces the system power consumption by relaxing technical requirements of the critical blocks in the design. But it mandates a complete RF transceiver 10' to demodulate the incoming RF signal into analog baseband and an analog FFT 28, the design of which is not trivial due to lack of accurately controlled delays in the analog domain. In addition, excessive device mismatch may deteriorate its performance further.

Prior art efforts to classify signals based on the features have relied on sophisticated digital signal processors (DSP) with their inherent size, weight, and cost. A DSP based approach to signal classification may have a probability of correctly classifying a signal greater than 99%. However, there is a need for a lighter, smaller, less expensive signal classification device even at the expense of a reduced probability of correctly classifying a signal.

It is known in the art to use a Super-Regenerative Oscillator (SRO) as an envelope detector. The SRO is normally tuned to a fixed center frequency during one operation. If there is no received signal present at the SRO center frequency, the SRO oscillation start-up process is determined by noise either from the outside environment or the SRO's internal noise, which is preferably small, and thus provides a relatively long start-up time; one the other hand, if there is a signal in the vicinity of the SRO center frequency, the SRO start-up process is accelerated and thus causes the short start-up time to be relatively short. Therefore, the input signal strength corresponds to the SRO start-up time. Further analysis shows the SRO start-up time is inversely proportional to the logarithm of the input signal strength and the SRO holds a dB-to-linear relation between the input signal strength and start-up time. This technique has been applied to receive and demodulate the incoming signals and serve as a receiver to low-rate garage door opener or other radios for many years, either in single ended or differential manner. See, for example, U.S. Pat. No. 6,873,838 Superregenerative oscillator RF receiver with differential output. These and other problems are at least partially solved by the principles of the present invention.

BRIEF DESCRIPTION OF THE INVENTION

In one aspect the present invention provides an apparatus for detecting amplitudes of recognizable signals in a frequency band or spectrum of interest, the apparatus comprising: at least one super-regenerative oscillator coupled to receive an input from an antenna, the super-regenerative oscillator having an adjustable frequency and having a start-up time which is a function of either a strength of a recognizable signal from said antenna which is near said center frequency or of noise, the start-up time for noise being longer than the start-up time of any recognizable signal from said antenna; a control circuit for adjusting the center frequency of the at least one super-regenerative oscillator as needed during successive time slots so that the at least one super-regenerative oscillator detects signals from said antenna over all of said radio frequency band or radio frequency spectrum of interest; and at least one envelope detector coupled to the at least one super-regenerative oscillator, the at least one envelope detector extracting said start of time of said at least one envelope detector during each successive time slot to thereby detect signals in all of said frequency band or spectrum of interest.

In another aspect the present invention provides a method of detecting amplitudes of recognizable signals in a frequency band or spectrum of interest, the method comprising: dividing the frequency band or spectrum of interest into bandwidth segments of interest; and detecting the presence of a signal having an amplitude in each bandwidth segment of interest by applying each bandwidth segment of interest to one or more super-regenerative oscillators and, if the one or more super-regenerative oscillators triggers to an ON state within a time slot, then determining the amplitude of a corresponding signal by measuring when the one or more super-regenerative oscillators triggers to its ON state within said time slot.

In yet another aspect the present invention provides a method of detecting amplitudes of recognizable input signals in a frequency band or spectrum of interest, the method comprising: providing one or more super-regenerative oscillators, wherein each of the one or more super-regenerative oscillators has a center frequency and wherein each of the one or more super-regenerative oscillators detects amplitudes of recognizable input signals in the frequency band or spectrum of interest during multiple time slots; varying the center frequency of each of the one or more super-regenerative oscillators between time slots; whereby the one or more super-regenerative oscillators extract the amplitudes of each the recognizable input signals in different time slot and with a different time-slot associated center frequency, thereby providing a time-frequency-amplitude map of the frequency band or spectrum of interest.

In still yet another aspect the present invention provides an apparatus comprising: one or more super-regenerative oscillators for extracting amplitudes of signals in a received signal mixture using different time-slot associated center frequencies, thereby providing a time slot dependent frequency-amplitude characterization of said signals in said received signal mixture; and a digital signal processor for classifying known signals in the received signal mixture by comparing the time slot dependent frequency-amplitude characterization of said signals in said received signal mixture with time slot dependent frequency-amplitude characterizations of known signals stored in a signal library.

BRIEF DESCRIPTION OF THE DRAWINGS

FIG. 4 depicts a super-regenerative oscillator based frequency/energy sampler.

FIG. 4A depicts several techniques for adjusting the frequency of a SRO.

FIG. 4B depicts an embodiment of a transistor-based envelope detector.

FIG. 5A depicts one embodiment of a super-regenerative oscillator array for signal classification according to the principles of the present invention. FIG. 5A shows an exemplary mapping of the input signal into a time-frequency-energy map. This embodiment utilizes N SROs to cover the frequency band of spectrum of interest in a single time slot.

FIG. 5B shows an exemplary mapping of the input signal into a time-frequency-energy map. This embodiment utilizes M SROs to cover the frequency band of spectrum of interest in a plurality of time slots.

DETAILED DESCRIPTION

Extracting a Signal Spectrum Amplitude Map

A fast signal feature extraction and classification function (to extract a signal spectrum amplitude map) can be provided by exploiting the effects of a Super-Regenerative Oscillator (SRO), preferably arranged in an array of a plurality of SROs, to capture a time-frequency-energy map of a received signal 11 and perceives the signal environment of the receiver through a simple and fast, low-power consuming, analysis. Unlike a normal receiver which performs signal demodulation then decodes the received information to provide a communication environment, the present invention provides an apparatus, such as a receiver, for a communication system, which receiver offers a "sniff" of the external signal environment (the radio frequency spectrum of interest), thereby allowing the receiver to assist subsequent communication needs, such as by identifying the channel(s) to use for communication, or the channel(s) to avoid, and also possibly determining the channels the communication system might want to jam through a high power transmitter (that is not shown in the accompanying figures). Such function(s) is(are) extremely desirable in a scenario with many concurrent communications, such as in a metropolitan region with dense wireless communication with many simultaneous signals being transmitted and received, and can avoid the problems, like channel collision and so on, for efficient communication protocols.

Figure 1:
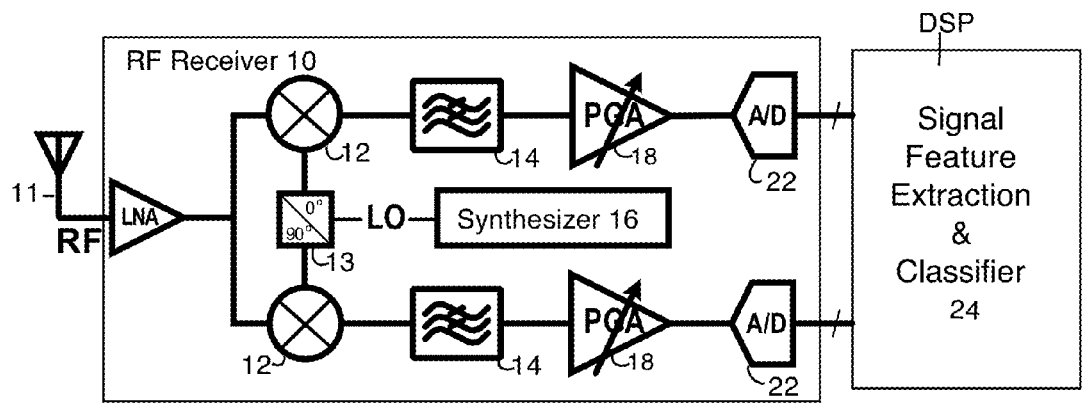
FIG. 1 depicts a prior art signal classifier architecture based on a traditional RF transceiver design and traditional digital signal processor (DSP).
Figure 2:
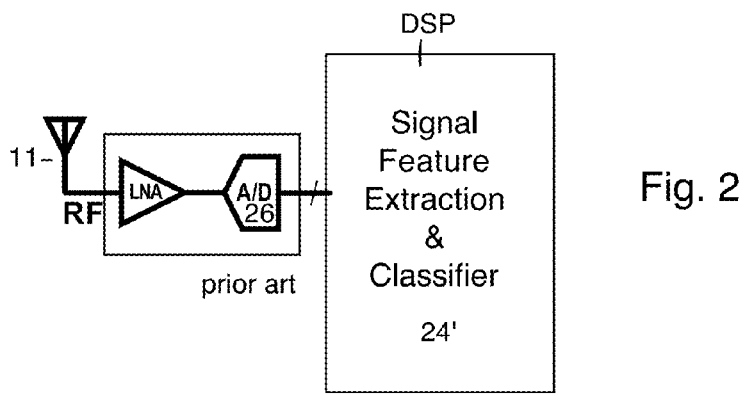
FIG. 2 depicts a prior art signal classifier architecture based on direct RF sampling and traditional digital signal processor.
Figure 3:
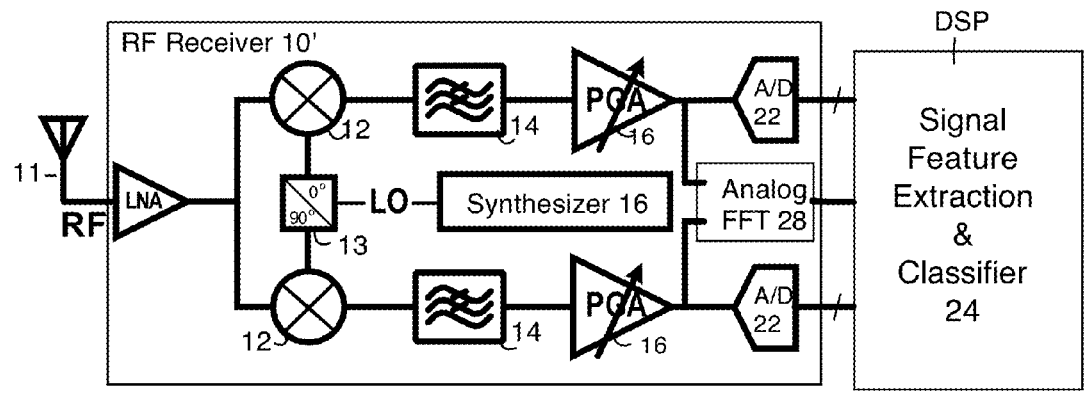
FIG. 3 depicts a prior art signal classifier architecture based on a traditional RF transceiver using traditional digital signal processing with analog FFT assistance in the transceiver.
Figure 5B:
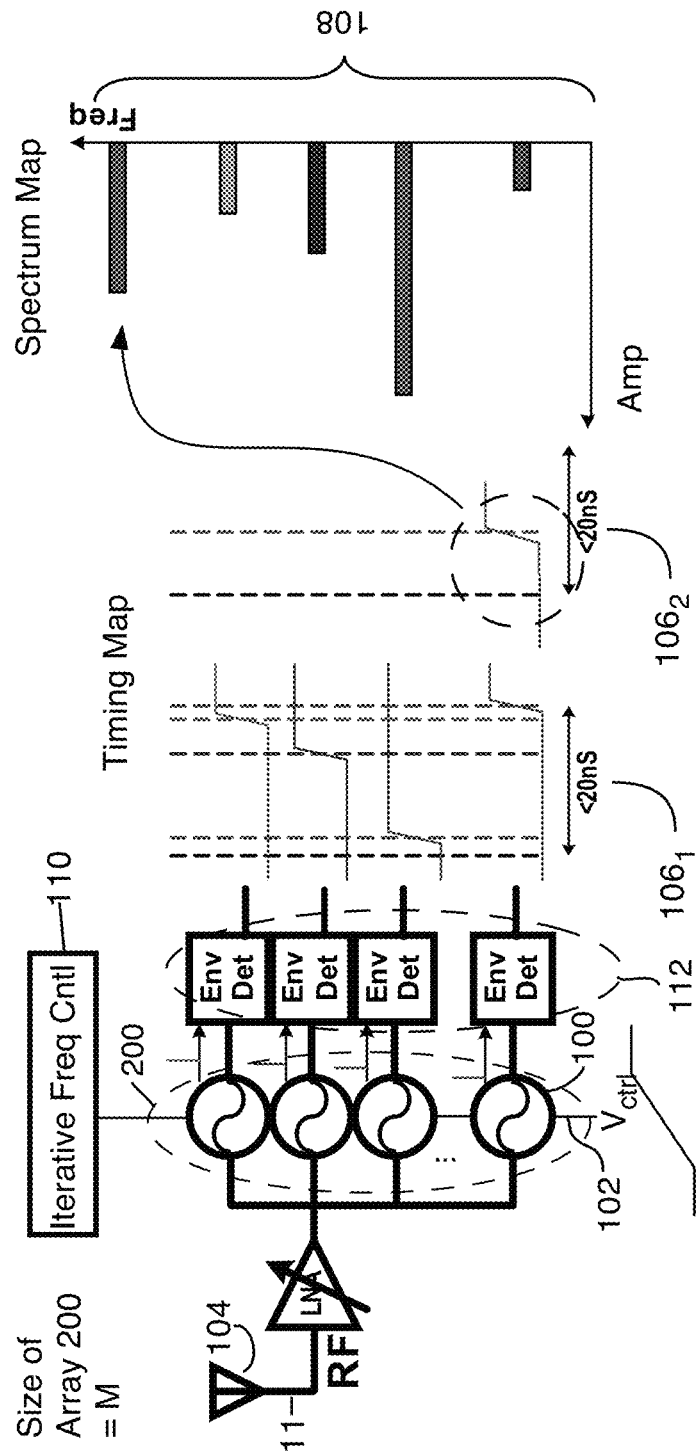
FIG. 5B depicts another embodiment of a super-regenerative oscillator array for signal classification according to the principles of the present invention.

While a single SRO 100 can be employed to "sniff" the external signal environment, preferably an SRO array 200 of a plurality of SROs 100 is used to "sniff" the external signal environment of a received signal 11. An embodiment with a single SRO 100 is depicted by FIG. 4 while embodiments with an array 200 of SROs 100 are depicted by FIGS. 5A and 5B. In all embodiments, the individual SROs 100 are periodically quenched (turned ON and OFF) by an external quench signal $V_{ctrl}$ 102, one for each SRO 100, or by a self-generated quench signal, whose response time is determined by the SRO ON/OFF time and can be as fast as ~3 ns for coarse signal extraction. The time during which the signal from the SRO 100 can go from OFF to ON is called a time slot herein and is depicted by the width $106_{ts}$ of a Timing Map 106 in FIGS. 5A and 5B (where the time slot is depicted as preferably having a period of less than 20 nSec). The top-most SRO in FIG. 5A is depicted as switching from OFF to ON within a period of time 107 which is shorter than the period of the time slot $106_{ts}$ which means that a signal was found in the signals 11 found the antenna which was within the bandwidth the topmost SRO and that found signal is represented on the right hand side of the figure as a corresponding signal 109 in the Spectrum Map 114. Signals from most of the envelope detectors 112 associated with each of the SROs 100 in the embodiments of FIGS. 5A and 5B can be seen changing from OFF to ON in Timing Maps 106 of these figures within time slot $106_{ts}$. The bottom-most SRO is depicted as switching from OFF to ON at the very end of the time slot $106_{ts}$, which means either (i) that a very weak signal was detected within the bandwidth of that SRO or (ii) no signal was detected if self-quenching is being used. The earlier that the signal from the associated envelope detectors 112 switch from OFF to ON within the time slot $106_{ts}$, the stronger the signal which was detected within the bandwidth of the associated SRO 100, as can be seen with reference to the Spectrum Map 114.

Generally speaking, the same thing happens in the embodiment of FIG. 4, but there is only one SRO 100 whose output changes from OFF to ON in each time slot.

If no signal is present, then the output of the SRO 100 preferably remains OFF in embodiments which use $V_{ctrl}$ to quench the SROs during the entire time slot since the noise which is present preferably takes longer to trigger the SRO ON than the duration selected for the time slot. Signal strength information is extracted using envelope detectors 112.

In the afore-described embodiments, the period of the time slot set by $V_{ctrl}$ is shorter than the self start up times of the individual SROs 100. But, sometimes it can be desirable for the period of the time slot 106 to be longer than the self start up times of the individual SROs 100, in which case (i) there is no need for an external signal for the $V_{ctrl}$ signal 102 (since the quenching signal is then inherently self generated) and (ii) the SRO's output(s) will typically change from OFF to ON in each time slot 106, either due to the presence of an external signal from the external signal environment of the received signal 11 or due to the self start up times of the individual SROs 100. Of course, if a signal is present in the external signal environment of the received signal 11 which a SRO 100 detects, then it changes from OFF to ON faster than it would have done so if no such signal were present and the SRO 100 just changed from OFF to ON due to is inherent self start up time. In these embodiments the period of the time slots 106 are preferably selected to be essentially equal to or slightly longer than the self start up times of the individual SROs 100. However, due to manufacturing tolerances, the self start up times of the individual SROs 100 will vary slightly and once one of the SROs 100 has switched from OFF to ON due to its inherent self start up time, it will no longer report the presence of a very weak signal (which is lower than its own noise level).

Typically some SROs 100 in an array will be less noisy (and thus more sensitive) than other SROs (due to manufacturing tolerances) and the down stream processing to take advantage of this will be a matter of design choice for such embodiments. However, as is discussed below, if an external signal is not used the $V_{ctrl}$ signal 102 (since the quenching signal is then inherently self generated), then the SRO's tank quality (set by the values for inductance and capacitance in FIG. 4A) is used to set its bandwidth which results in less design flexibility.

Returning to the embodiment of FIG. 4, the single SRO 100 of FIG. 4 is initially tuned to a first fixed center frequency during a first time slot, second fixed center frequency during a second time slot, third fixed center frequency during a third time slot and so forth until all of the spectrum of the. Each time slot is the duration of the $V_{ctrl}$ signal 102 (if used) or its self start up time (if signal 102 is not used). During the first time slot, the SRO 100's bandwidth covers a first portion of the entire spectrum to be analyzed. If there is no received signal present at the antenna 104 at the SRO's center frequency, the SRO 100 oscillation start-up process is determined by either the noise either from the outside environment or SRO 100's internal noise, which is small, and this noise, being small compared to a signal at the antenna 104, causes start-up time of the SRO 100 to be of a relatively long duration compared to if a signal is present or if the $V_{ctrl}$ signal 102 is used. If there is signal in the vicinity of the SRO 100's center frequency (within its bandwidth), the SRO 100 start-up process is accelerated and a comparatively short start-up time occurs as a result. The input signal 11 strength corresponds to the SRO start-up time and analysis shows (i) the SRO start-up time is inversely proportional to the logarithm of the input signal strength and (ii) the SRO holds a Log-linear relation between the input signal strength and start-up time. The present invention utilizes the SRO as a fast detector to identify the signal characteristics, such as the presence of a signal in a frequency, its associated signal strength and its sustaining time, in a very short time (the "sniff" referred to above).

Continuing with the discussion of the embodiment of FIG. 4, if a signal is found within the first portion of the entire spectrum to be analyzed, then the second fixed center frequency can be set the and the second time slot can be immediately initiated. Otherwise, if no signal is found within the first portion of the entire spectrum to be analyzed, then the second fixed center frequency is be set the and the second time slot is initiated after the first time slot has completed. This process continues until the entire spectrum to be analyzed has been analyzed and then it starts over with a new first time slot and continues iteratively.

So each time slot can be cut short in time, if desired, once the SRO 100 has gone from OFF to ON since there is no further information to be garnered by continuing to sense the output of the SRO's associated envelope detector 114.

Because the SRO's detected frequency is determined by its self-oscillation frequency, the detected center frequency can be adjusted, for example, by programming the self-oscillation frequency, which may be accomplished, for example and without implying a limitation, by controlling a control voltage for varactor 100V and/or for a variable inductor 110L (see FIG. 4A) or by a control word controlling a group of switched capacitors 100C and/or switched inductors 100L (see FIG. 4A). In such embodiments, without implying a limitation, the resonant frequency of the SRO 100 is controlled by a signal or a control word 103, whether that signal is a voltage or a control word for the settings of the switched capacitors 100C and/or inductors 100L. The signal 103 determines the capacitance C of capacitor 100C and/or the inductance L of 100L, and together with any additional tank inductance, the tank resonant frequency $f_{res}$ can be derived from $$f_{res} = \frac{1}{2\pi\sqrt{LC}}.$$

Varying signal 103 produces a changing tank resonant frequency and thus signals 103 can change the center frequency of the SRO 100 whose frequency it controls.

The slope of the external quench $V_{ctrl}$ signal 102 governs SRO detected frequency range, i.e. the Q of the SRO 100, so the SRO 100 can also be configured to monitor a desired frequency band. It is a characteristic of this SRO and of SRO's in general that the slope of the $V_{ctrl}$ signal sets the bandwidth of the SRO. The greater the slope of the $V_{ctrl}$, the greater the bandwidth. The SRO's pass band bandwidth is configured or controlled by the slope of the external $V_{ctrl}$ signal 102 while the SRO center frequency is controlled by the varactor control voltage and/or the control word (collectively referred to be reference numeral 103) controlling the group of switched capacitors 100C and/or inductors 110L. Each SRO 100 can have identical $V_{ctrl}$ signals with different frequency control voltages 103, or with different digital switching capacitor control words 103 to respond to different frequencies of interest. Furthermore, the Super-Regenerative (SR) process is controlled by the external quench signal 102, it can be scheduled to sample the incoming signal energy and phase at a dedicated time slot.

In the embodiments of FIGS. 4, 5A and 5B the SRO 100 can resolve frequency, energy, phase and timing for signals of interest in the incoming signal 11. To extract the energy of signals of interest in the incoming signal 11, the controlled SRO 100 preferably samples the energy strength during the self-oscillation build-up process and encodes the signal strength into the oscillation start-up time, which indicates the signal energy around the oscillation frequency of the SRO 100. It is based upon the logarithmic SR process that can be accelerated by the input signal energy, which otherwise is a slow process built from the intrinsic thermal noise. The SR process start-up time can be expressed by:

$$t_{start-up} = \tau_{rise} \log\left[V_{OSC} / \sqrt{V_{sig}^2 + V_n^2}\right] \quad \text{(Eqn. 1)}$$

where $\tau_{rise}$ is the time constant of the exponentially increasing oscillation envelope, $V_{osc}$ is the zero-peak RF voltage of the saturated oscillator, and $V_{sig}$ is the imposed signal voltage 104. Therefore, SROs 100, as shown in FIGS. 4, 5A and 5B, can convert the input signal 11 energy from antenna 104 into a timing map to resolve the signal spectrum amplitude map repetitively.

In the embodiment of FIG. 4, the SRO 100, after being tuned to the first fixed center frequency (by signal 103) during the first time slot by the application of a $V_{ctrl}$ signal 102, is tuned to the second fixed center frequency (again by signal 103) during the second time slot by the application again of $V_{ctrl}$ signal 102. Each application of the $V_{ctrl}$ signal 102 gives another measurement of the signal strength at the oscillation frequency of SRO 100 at a different frequency band of interest as controlled by signal 103. This process continues until the entire spectrum of interest has been analyzed and then the process repeats itself, preferably as controlled by an iterative frequency controller 110. The frequency of the SRO 100 can be adjusted by using, for example, variable or switched inductors 100L, variable or switched capacitors 100C or a varactor 100V as depicted in FIG. 4A as previously mentioned. As is discussed below, the bandwidths of the SROs 100 is controlled by the slope of the external $V_{ctrl}$ signal 102 or by the tank quality (the values of inductors 100L and capacitor 100C) of the SRO 100. An external $V_{ctrl}$ signal 102 having a slope or slew rate is preferably used due to its convenience and flexibility it setting the bandwidths of the SROs 100.

The iterative frequency controller 110 provides the individual values for the $V_{ctrl}$ signals 102 based on an algorithm designed to allow estimation of the signal 11 characteristic from a sparse set of features. In one preferred embodiment, the iterative frequency controller 110 sets the $V_{ctrl}$ signals 102 according to a Segmentlet algorithm that uses the start and stop frequencies of the spectrum to be analyzed and the expected sparsity of the spectrum. Sparcity in this context means the fraction of the bandwidth expected to contain signals. See *Approximation of Functions over Redundant Dictionaries Using Coherence* by Gilbert, A. published 7 Oct. 2002 (herein Gilbert) and incorporated by reference as though fully set forth herein.

In the embodiment of FIG. 4, the center frequency of SRO 100 can be adjusted to cover a desired range of center frequencies from $f_1$ to $f_n$, is first tuned to frequency $f_1$ by a iterative center frequency control block 110. SRO 100 resolves the signal found in the external signal environment, like signal strength (a noise-level signal strength implies no signal in $f_1$), during time slot $t_1$, which time slot can be determined by an external quench signal 102 or by the self-quench time of the SRO 100. Then, the SRO 100 is configured by block 110 to different center frequency $f_2$ during time slot $t_2$, preferably by means of a control signal $V_{ctrl}$ signal 102. The $V_{ctrl}$ signal 102, in a preferred embodiment, sets the center frequency of the SRO 100 through a voltage or other signal applied to a varactor 100V, a switched or variable capacitor 100C or a switched or variable inductor 2001 either inside the SRO 100 or associated with it (see FIG. 4A). This process continues until an entire bandwidth of interest from $f_1$ to $f_n$ is scanned and the associated signal information is extracted, and then the process may start over. By summarizing the measurement results, the external signal environment, such as the signal strength at $f_1$ during $t_1$, the signal strength at $f_2$ during $t_2$, etc, can be captured and used to characterize the input signal 11 as a one of a particular type as defined by its features according to the dictionary described in Gilbert.

The above sniffing process used by the embodiment of FIG. 4 is comparatively slow if only one SRO 100 is employed (as shown by the embodiment of FIG. 4), which process we call "serial iterative scanning". However, if a SRO array 200 is used to facilitate the process, as shown by the embodiment of FIG. 5A, for example, where N SROs 100 are each tuned into different frequencies and cover the entire of spectrum of interest from $f_1$ to $f_n$ in a single time slot 106, then each SRO 100 in the array 200 is able to characterize the signal condition around its own center frequency, which may be called "parallel iterative scanning".

The SROs 100 forming array 200 of FIG. 5A are each are tuned to different center frequencies and cover the entire frequency band or spectrum of interest 108 from $f_1$ to $f_n$. Each SRO 100 is responsible to characterize the signal strength around its own center frequency. Such an SRO array 200 delivers a complete signal strength representation either through each SRO's start-up time (or as controlled by the $V_{ctrl}$ signal 102 or the SRO's start start up time) and can cover the whole desired frequency band or spectrum 108 in each and every time slot $106_{ts}$. Each SRO 100 characterizes the input signal strength at a different center frequency and then converts the signal strength into a start-up time. The start up time is the time between the beginning of the time slot 106 and the output of the Envelope Detector 112 indicating the presence of a signal. By aggregating all the start-up time of all SROs 100, a Timing Map can be resolved and subsequently a signal strength across the observed spectrum 108 map can be derived by exploiting the relation between the input signal strength and SRO start-up time. If an SRO 100 either self starts or does not start, then that corresponds to no signal in its corresponding portion of the spectrum 108.

Thus, the SRO array 200 of FIG. 5A can deliver a complete signal strength map 114 across the whole desired frequency band or spectrum of interest 108 in each and every time slot 106$_{ts}$. The map 114 changes with time as the amplitudes of the detected signals change and as signals within the spectrum of interest 108 come and go. The SRO array 200 of FIG. 5A accelerates the capture speed by N times compared to the embodiment of FIG. 4. However, this parallel approach increases the hardware cost by approximately N times as well. The embodiment of FIG. 5A works iteratively, but each iteration produces preferably a complete signal spectrum amplitude map during each time slot (that is, during each iteration).

The LNA depicted in the front end (between antenna 104 and the SRO's 100) may either have a fixed gain or a variable gain (as depicted by the arrow across it in FIG. 5A).

An alternative embodiment, depicted by FIG. 5B, uses an SRO array 200 with M SROs, where M<N (recalling that N=the number of SROs 100 needed to cover the entire spectrum of interest 108 in a single time slot 106$_{ts}$). While the array 200 has a plurality (M) of individual SROs 100, the array 200 of FIG. 5B does not have sufficient SROs 100 fully analyze the entire frequency band or spectrum of interest 108 in a single time slot. Since each SRO's center frequency can preferably be tuned to any frequency within the spectrum of interest 108, the SROs 100 of array 200 of FIG. 5B can be used to resolve the signal characteristics of the external environment in an iterative manner with a much shorter time compared with serial iterative scanning of FIG. 4, but with a longer time compared to the "parallel iterative scanning" embodiment of FIG. 5A with its N SROs 100, by updating the center frequency of the affected SROs in different time slots. Two time slots 106$_1$ and 106$_2$ are depicted in FIG. 5B, but the total number of time slots 106 needed to cover the spectrum of interest 108 will depend of the ratio of the spectrum of interest 108 to the bandwidth of an individual SRO 100. We call this approach "parallel-serial iterative scanning". Additionally, a frequency tuning algorithm based can be developed to further accelerate the scanning speed, therefore, we call that approach "smart scanning". The two time slots 106$_1$ and 106$_2$ are each shown as preferably having periods of less than 20 nS which periods are set by V$_{crtl}$ in this embodiment. Self quenching of the SROs 100 may be used instead in which case signal V$_{crtl}$ may be omitted in this embodiment. The two time slots 106$_1$ and 106$_2$ are each shown as having the same periods, but it may be that certain parts of the spectrum of interest are really of greater interest than are other portions and the nominal periods the time slots can be adjusted according if that is the case. Also, as mentioned above, individual time slots associated with individual SROs can be shortened once a signal is detected as the SRO goes from OFF to ON, in order to speed up the analysis of the external signal environment.

In the embodiments of FIGS. 5A and 5B, if the spectrum of interest 108 requires N SROs 100 to cover it in a single time slot, the embodiment of FIG. 5A will cover the entire spectrum of interest in a single time slot 106$_{ts}$ while the embodiment of FIG. 5B will cover the entire spectrum of interest in multiple single time slots 106$_{ts}$. If one assumes that it takes a total of five SROs 100 to cover the entire spectrum of interest (so assume that N=5), and if the embodiment of FIG. 5B only has four SROs 100 (so then M=4), then during a first time interval 106$_1$, only four-fifths of the spectrum of interest 108 can be scanned, so the remaining portion of the spectrum of interest 108 is scanned in the second time slot 106$_2$ (which is depicted by the broken-line circle in the second time slot 106$_2$ which encircles the second OFF-ON transition and which corresponds to the highest frequency of the spectrum map in this embodiment—as denoted by the line with the arrow). Of course, this is not a particularly efficient way of reducing the number of SROs 100 needed in array 200. So let us consider a more efficient approach. Let us assume that N=100, so it would require 100 SROs 100 if the entire spectrum of interest 108 were to be analyzed in a single time slot 106$_{ts}$ in the embodiment of FIG. 5A. If M=50, then the number of SROs 100 for the embodiment of FIG. 5B is reduced to 50% of the number required by the embodiment of FIG. 5A, but the number of time slots 106$_{ts}$ needed will be doubled to two time slots 106. If M=25, then the number of SROs 100 is reduced to 25% of the number required by the embodiment of FIG. 5A, but the number of time slots 106$_{ts}$ needed will be four. So the embodiment of FIG. 5B can require significantly less hardware as a tradeoff against needing more time slots 106 to process the entire spectrum of interest 108.

Of course the bandwidth of an individual SRO 100 is itself an engineering trade off between the desired detail of the spectrum map versus the amount of time and/or the amount of hardware needed to obtain it. Also, the outputs of the envelope detectors 114 have been shown as changing from OFF to ON when a signal is detected. Of course, those skilled in the art will appreciate the fact that the logic can be reversed so that a transition from ON to OFF is sensed instead.

The embodiment of FIG. 5B also utilizes an iterative frequency control circuit 110 to adjust the center frequencies of the SROs 100 with changing time slots 106 so that the entire spectrum of interest 108 is covered during the number of time slots needed to analyze the entire spectrum of interest 108. The embodiment of FIG. 5A is also shown with an iterative frequency control circuit 110 to adjust the center frequencies of the SROs 100 as needed. This can occur, for example, when the frequency spectrum of interest changes. And if the frequency spectrum of interest changes is a value bigger than which the number of SROs an accommodate using the parallel iterative scanning taught with respect to FIG. 5A, then the receiving apparatus can preferably automatically shift to the parallel-serial iterative scanning taught with respect to FIG. 5B.

FIG. 4 illustrates one embodiment of signal strength extraction by using a single SRO 100 while FIGS. 5A and 5B depict embodiments utilizing an array 200 of SROs 100. The signal from the outside environment is received by the antenna 104 and amplified by the following Low Noise Amplifier (LNA). Subsequently, the signal 11 is sent to the one or more SROs 100, whose center frequency is preset to a dedicated center frequency f$_1$, f$_2$, f$_3$ . . . and its start-up process is controlled by a V$_{ctrl}$ signal 102. V$_{ctrl}$ signal 102 can be either an external input signal or a self-generated quench signal, but an external input signal is preferred due to the flexibility it provides in SRO bandwidth control, as mentioned above. If the RF signal 11 from the external environment (received via antenna 104) has signal content around frequency f$_1$, the SRO start-up time of the corresponding SRO is accelerated, which otherwise would be determined by the strength of the noise from the environment and/or of the SRO itself. The envelope detector 112 is used to extract the start-up time by filtering out the SRO oscillation frequency. Because the SRO start-up time is inversely proportional to the logarithm of the input signal strength, the input signal strength at the SRO center frequency $f_1$ can be represented by the SRO start-up time. The envelope detector 112 can be formed by a diode together with a low pass filter or a transistor-based rectifier together with a low pass filter (see FIG. 4B, where IP and IN are the differential inputs and the OUT gives the input signal envelope).

Resolving Phase Information

Figure 6:
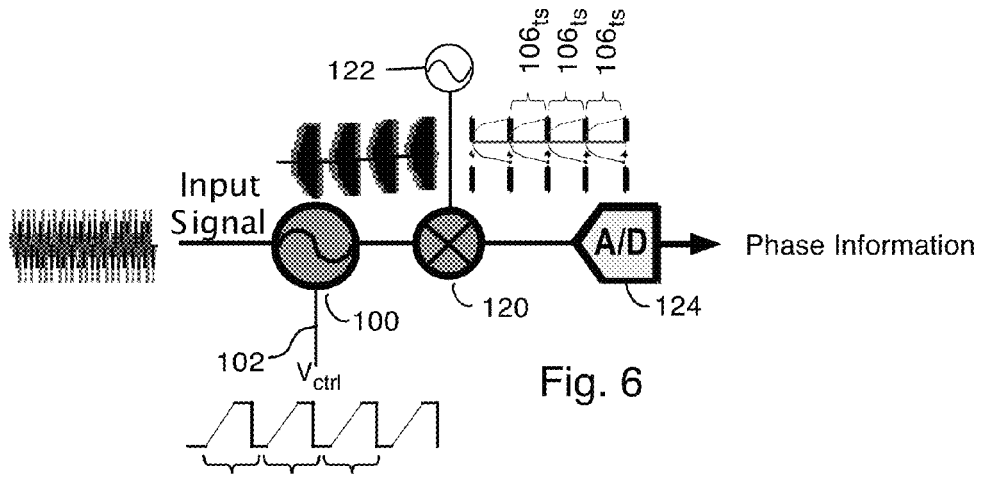
FIG. 6 depicts a super-regenerative oscillator based frequency/phase sampler for supporting signal classification.

Other than the signal frequency, the signal strength and timing information that are resolved by the embodiments of FIGS. 4, 5A and 5B, the principles of the present invention also offers a method to resolve the incoming signal phase information as illustrated by FIG. 6. This is because each SRO 100 inherits the incoming signal phase information during its start-up process. In addition, a mixer 120, whose LO frequency is set identical by a reference oscillator 122 to the SRO's center frequency, is used to demodulate the inherited phase information of the SRO 100's output signal into a DC voltage during each time slot 106. An Analog to Digital Convertor (ADC) 124 or a series of voltage comparators can be used to extract the signal phase information for each signal at a frequency set by $V_{ctrl}$ signal 102 each time slot 106. An alternative technique is to use an ADC to directly demodulate the phase information out of the SRO output, which is feasible, but more power consumptive. This phase extraction function can be an additional feature to the above "series scanning" of FIG. 4, "parallel scanning" of FIG. 5A or "series-parallel scanning" of FIG. 5B approaches described above. Consequently, the SRO array 200 can provide a time-frequency-strength(energy)-phase map to describe the signal environment and leads to characterization of the input signal and an efficient communication system.

Each SRO 100 is normally tuned to a fixed center frequency during a time slot 106. If there is no received signal present at the SRO's center frequency or within the bandwidth of the SRO 100, the SRO oscillation start-up process is determined by the noise either from the outside environment or by the SRO's internal noise, which is small, and causes a long start-up time (preferably longer than the duration of a time slot 106); if there is some signal in the vicinity of the SRO's center frequency, the SRO start-up process is accelerated and causes a shorter start-up time to occur (and the duration selected for the time slot is preferably designed to capture the SRO start-up as it goes ON). The input signal strength corresponds to the SRO start-up time as mentioned above. In addition, the SRO 100 retains the identical phase as the incoming signal during start-up. Hence, the SRO 100 encodes the incoming signal phase information into its output and that phase information can be extracted as well as described with respect to FIG. 6 above. Mixer 120 in FIG. 6, whose Local Oscillator frequency 122 is set identically to the SRO's center frequency, may be used to demodulate the inherited phase information of the SRO output signal into a DC voltage during each time slot.

Continuing with FIG. 6, the ADC 124 may be rather coarse (3-4 bits) or voltage comparators may be used instead to extract the signal phase information. A coarse ADC 124 is preferred in the embodiment of FIG. 6 since it is a compact device which requires little energy to operate. If an ADC is used to directly demodulate the phase information out of the SRO output, that is a more power consumptive embodiment given the required processing by the DSP.

The one or more SROs 100 can also serve as a phase sampler during the self-oscillation build-up since the regenerated oscillation phase is directly related to the input signal phase and can be expressed as $$\phi_{osc} = \phi_{sig} + \sin^{-1}(2 \times (\omega_{sig} - \omega_{osc})/\Delta\omega_{lock}) \qquad \text{(Eqn. 2)}$$

where $\phi_{sig}$ and $\omega_{sig}$ are imposed signal phase and angular frequency $\omega_{osc}$ is the SR oscillator angular frequency and $\Delta\omega_{lock}$ stands for locking range. Different from injection locking, the SR process only samples the input signal phase during self-oscillation build-up and holds it. Given a steady input signals and fixed SR oscillation frequency, the second term is constant so that the regenerated oscillation has identical phase variation as the input signal. And this phase variation can be derived by mixing with a reference oscillation at $\omega_{ref}$, preferably equal to $\omega_{osc}$. The process can be described as follows:

$$P_{det} = \sin(\omega_{osc} t + \varphi_{osc}) \times \sin(\omega_{ref} t) = \qquad \text{(Eqn. 3)}$$
$$\frac{\sin((\omega_{osc} + \omega_{ref})t + \varphi_{osc}) + \sin((\omega_{osc} - \omega_{ref})t + \varphi_{osc})}{2}$$

by disregarding high frequency term ($\sin((\omega_{osc}+\omega_{ref})t+\phi_{osc})$) and making $(\omega_{osc}-\omega_{ref})t \ll \phi_{osc}$, then $P_{det} \cong \sin(\phi_{osc})$. The frequency difference requirement is not very tight due to a short processing time t (on the order of nanoseconds).

Returning to FIG. 6, this figure depicts an SRO 100 based frequency/phase sampler. The SRO 100 is periodically built-up and decayed by the $V_{ctrl}$ signal 102 and it samples the input signal phase around the SRO's center frequency, where mixer 120 and reference local oscillator 122 are used to map the phase information into DC voltage that is detected by ADC 124. Such phase extraction is coarse and may have an accuracy limited by the resolution of ADC 124 as well as the SRO/mixer noise and mixer linearity. A hypothetical input signal, consisting of three CW tones with different frequencies, signal strength and phase, is received by the SRO 100. The $V_{ctrl}$ signal 102 quenches the SRO periodically and, as shown in FIG. 6, the quench signal is shown with four ON-OFF transitions corresponding to four time slots 106. If the SRO's center frequency is sequentially tuned to the frequency corresponding to the three CW tone frequencies in three different time slots, the output signal of SRO 100 encodes the signal strength and phase into its output signal. For instance, the first tone is stronger than the second tone. Correspondingly, the output of SRO 100 for the first tone has a shorter start-up time than for the second tone when the SRO 100 is tuned to the frequency of the first tone rather than the second tone. Simultaneously, the phase information can also be extracted by the mixer 120 together with a reference frequency from element 122, which is set to the SRO's center frequency. For instance, given the first tone has a phase $P_1$, it is then converted to a high voltage at the output of the mixer 120 during each time slot, while the second tone has a phase $P_2$ and is converted to a low voltage output of the mixer 120 during each time slot. Such conversion can be described by Eqn. (3) and translates the phase information of the input signal at different frequency into voltages. Without implying a limitation, the output voltage of the mixer 124 can be quantized by a 3-4 bit ADC 124, for example.

Figure 7:
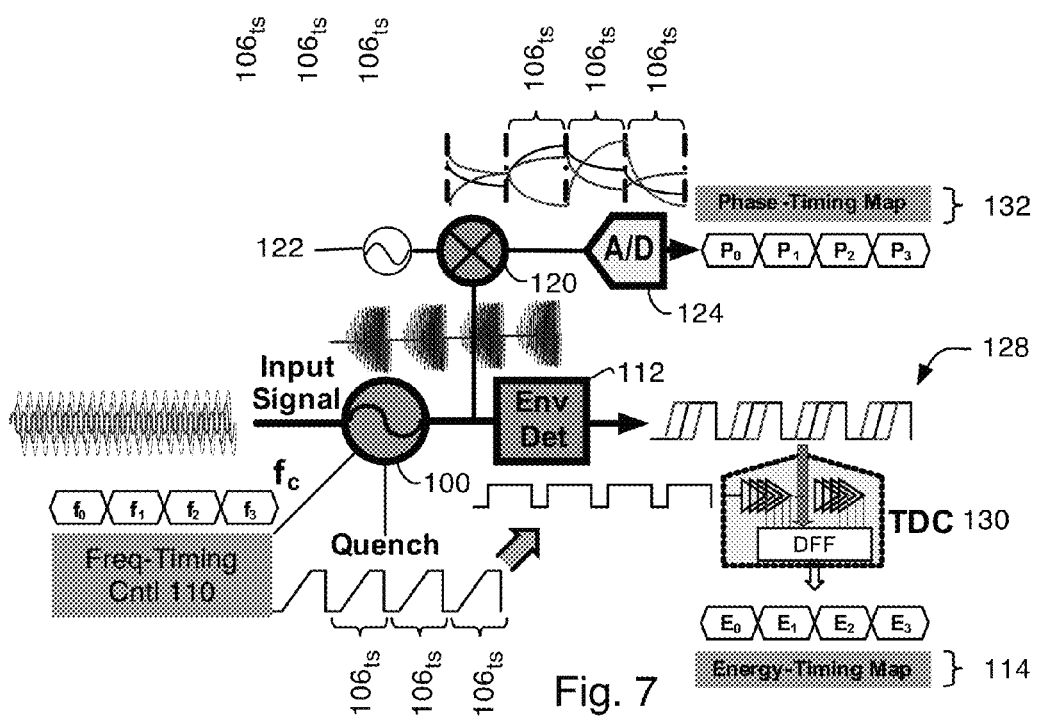
FIG. 7 depicts an embodiment of a super-regenerative oscillator for signal classification which resolves both signal energy and phase information.
Figure 8A:
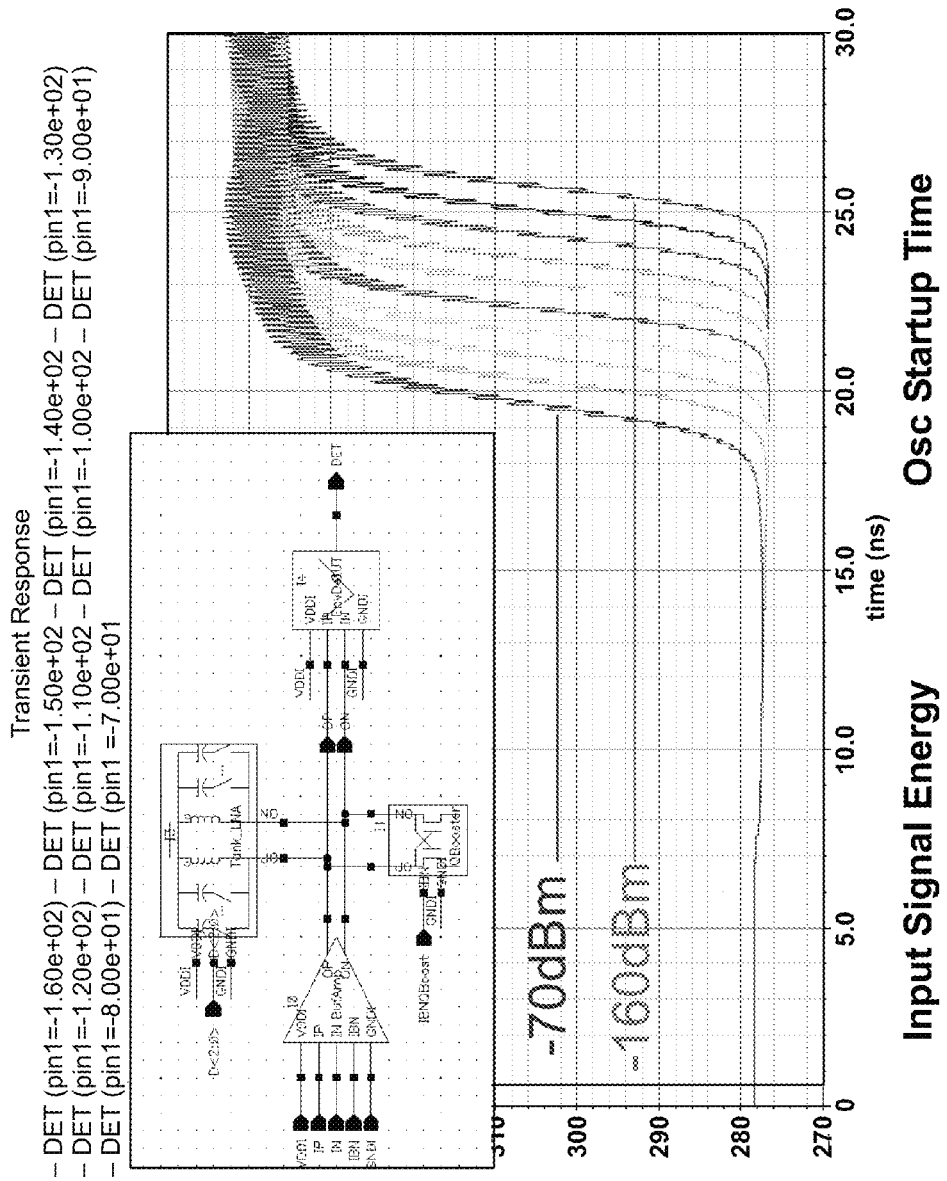
FIGS. 8A and 8B show simulation results of the super-regenerative oscillator sampling input signal energy and phase.
Figure 8B:
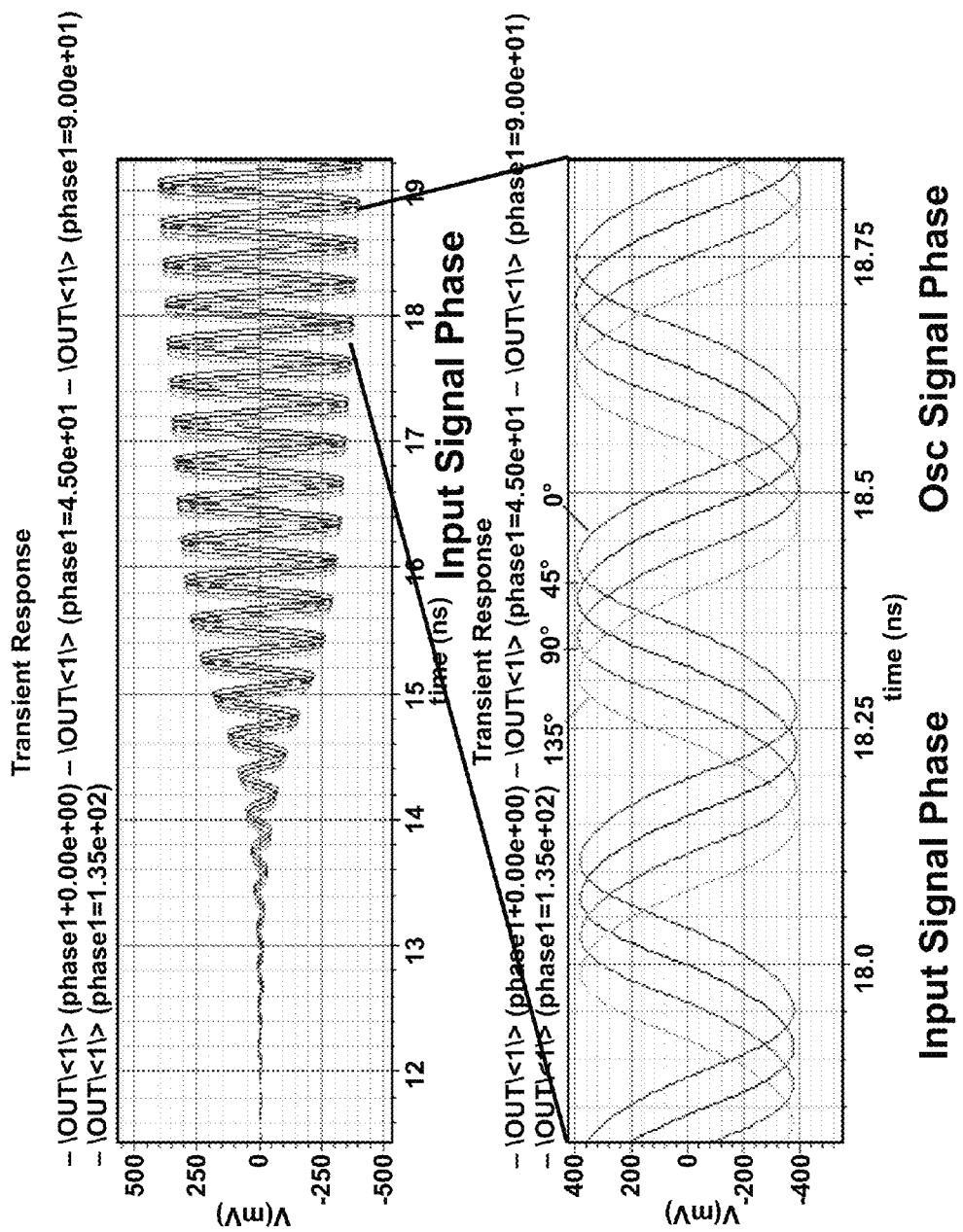

FIG. 7 shows the combined circuitry for the SRO 100 to resolve both signal energy and phase information. FIG. 8 presents simulation results showing how the SRO 100 of FIG. 7 samples the input signal energy and phase.

In FIG. 7 the input signal consists of multiple frequencies and can be represented by the superposition of many individual signals with different frequencies and phase. To extract signal characteristics, one approach can be to extract the signal characteristics of each individual signal. To do so, the SRO 100 is configured into different center frequencies $f_0$, $f_1$, $f_2$, $f_3$ by a center frequency control signal $f_c$ through the switching the inductor and/or capacitor and/or varactor of FIG. 4A. Center frequency control signal $f_c$ provides the input frequency-timing control and is generated by iterative frequency control 110. By using the substantially identical mechanism described with reference to FIG. 4, the input signal strength around frequencies $f_0$, $f_1$, $f_2$, $f_3$, as controlled by $f_c$, is then converted into different start-up times of SRO 100 output as controlled by the $V_{ctrl}$ signal 102. The output signal of SRO 100 is subsequently converted into a pulse train 128 with different duty cycle in each time slot 106 by the envelope detector 112, representing the corresponding SRO output start-up time. A time-to-digital converter (TDC) 130, composed of a delay chain, counter, register and buffer, quantizes the duty cycle of the pulse train 128 in each time slot 106 (the pulse train 128 depicted in FIG. 7 only shows four time slots 106 associated therewith, it being understood that there would be many time slots 106). Since the duty cycle has the information of SRO start-up time, and that represents the input signal strength information at the frequency difference, a signal strength energy-timing-map can be resolved by the TDC 130. Similar to the mechanism described by FIG. 6, the input signal phase information at frequencies $f_0$, $f_1$, $f_2$, $f_3$ can also be extracted and a signal phase-timing map 132 can be formed accordingly. By combining the frequency-timing control map and acquired energy-timing map 114 and phase-timing map 132, a time-frequency-strength(energy)-phase map to represent the input signal characteristics can be achieved. FIG. 8 provides the simulation results of the embodiment of FIG. 7. When the input signal strength changes from −160 dBm to −70 dBm, the output pulse rising edge, from the envelope detector, changes and suggests a stronger input signal at the SRO center frequency with an early rising edge and a weaker input signal with a later rising edge. Here, we zoom in the region of rising edge of each pulse to provide a clear presentation. The right hand portion of FIG. 8 shows the phase extraction process. With different input signal phase around the SRO center frequency, the SRO output demonstrates different phase as well. We zoom in a portion of SRO output signal and observe four different phases, 0°, 45°, 90°, and 135° of the output that correspond to the input signal phase difference in the simulation.

An SRO array 200 preferably covers an entire frequency band of interest and it can resolve the frequency, energy, phase and timing map for the incoming signal mixture. The number of SROs 100 needed in an array 200 is determined by the frequency bandwidth over the frequency resolution. For example, a 50 MHz bandwidth requires a hundred SROs 100 to support a 0.5 MHz bandwidth measurement resolution. Since the information is sparse in most domains, compressive sensing (CS) can be applied to increase the signal processing throughput and decrease the oscillator array scale by compressing information at the point of signal sampling, where the oscillator number can be reduced by the compression ratio and expressed by $$\frac{\text{Observing Frequency Bandwidth}}{\text{Frequency Resolution} \times \text{Compress Ratio}}.$$

Given a compression ratio 10, the oscillator number in pervious example can be reduced to 10. A CS algorithm can reduce the required number of SROs 100 needed in array 200 to save hardware cost and processing complexity. FIG. 10 depicts using M arrays instead of N arrays as in FIG. 9 to reflect a smaller array size by assuming an array of size M can be employed by using CS techniques so the center frequencies of the SROs 100 range from $f_{c1}$ to $f_{cM}$.

To conduct blind source separation and classification, the SRO array 200 maps the input signal 11 mixture into a time-frequency plane, which is controlled by a series of chirp $V_{ctrl}$ signals 102 to sweep the oscillator center frequency. Therefore, the SRO array 200 resolves the incoming signal energy along the chirped frequency and derives the segmentlet coefficient vectors as a feature vector for a signal classifier. However, it is not necessary to generate all the chirps given the sparse incoming signal mixture. The SRO array 200 can be either time interleaved or cover limited range to generate a small number of segmentlets with a sparse approximation algorithm. The SRO array 200 can deliver sufficient instructions to perform blind source separation along with simple histogram processing and decision making, template matching for various multiple access schemes, and conversion of analog classification results into continuous parameter estimates, such as symbol rate, center frequency and signal strength. The center frequency and signal strength may be derived directly from the SRO array 200 while the symbol rate may be derived through processing within the DSP 24 by autocorrelating the center frequency, signal strength and phase. The inverse of the amount of delay shifts in the autocorrelation is the symbol rate.

Figure 9:
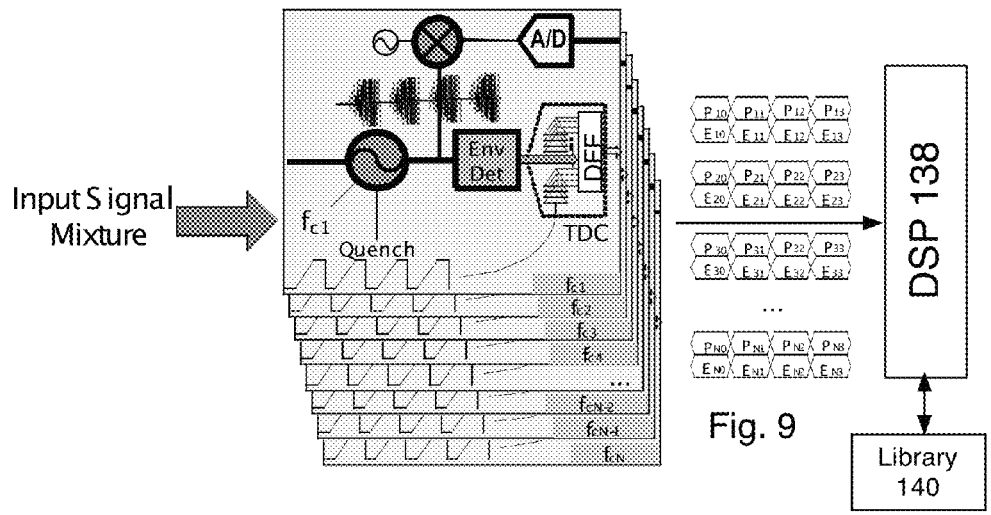
FIG. 9 depicts a SRO array according to the principles of the present invention. to take snapshots of incoming signal mixtures and develop the frequency, energy, phase and timing map of the incoming signal mixtures.
Figure 10:
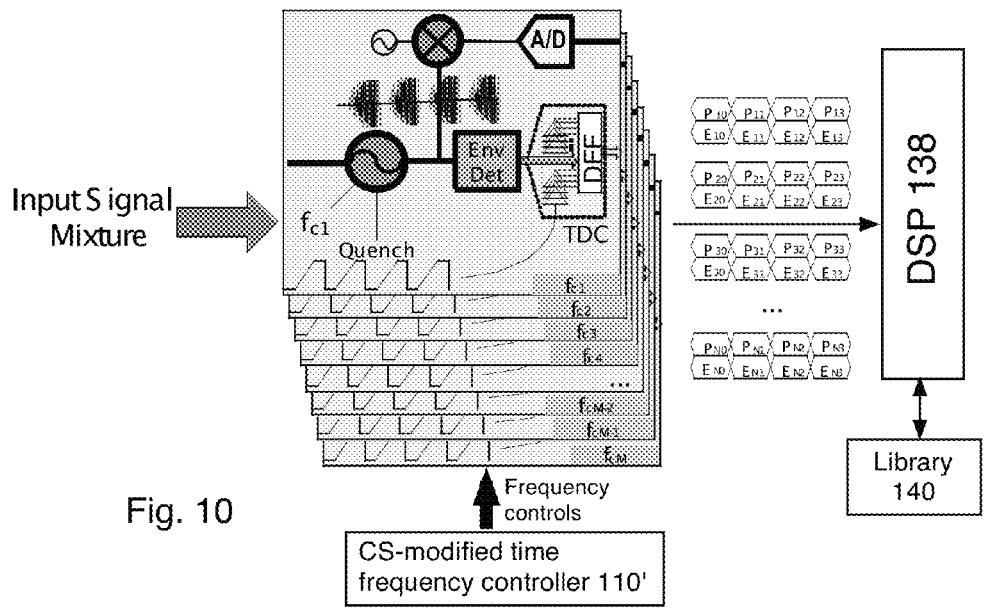
FIG. 10 is similar to FIG. 9, but includes a CS-modified frequency-timing controller for doing compressing sensing.

The SRO array 200, as shown in FIG. 9, is designed to take a snapshot of the received RF signal features such as the frequency, energy, phase and develop the timing map of the incoming signal mixture. With a sparse approximation algorithm as described in Gilbert, the Signal Analyzer of FIG. 9 does not need to cover the entire spectrum map 108 of interest with numerous SROs 100, but with a limited number of SROs 100. Each of the N characterizers (SROs 100) can utilize simple RF building blocks without stringent performance requirements, such as SRO 100, mixer 120 and envelope detector 112; and it features a low power, compact implementation. A time-to-digital converter (TDC) 130 quantizes the input signal energy information and an ADC 124, which is preferably very coarse, digitizes the phase information which then conveys that to, for example, a reservoir computer-based signal classifier and DSP, or a normal DSP, or conventional signal classifier to analyze the signal features based upon the acquired signal the frequency, energy, phase and timing map of the incoming signal mixtures.

In FIG. 9, the signal mixture is the amplified incoming signal 11 from the front-end LNA and antenna, as shown in FIGS. 4, 5A and 5B, but not shown in FIG. 9. In this embodiment, the SRO array 200 comprises a plurality of circuits of the type shown in FIG. 7 for example. Each circuit of the type shown in FIG. 7 is configured in an independent frequency-timing control, and resolves the corresponding energy-timing and phase-timing map. When multiple SROs are used with different frequency-timing controls, characteristics of the signal mixture can be extracted, represented by many time-frequency-energy-phase maps. Without implying a limitation, signals, such as a GSM signals (cell phone) or FM signals, have unique characteristics and can be categorized according to the time-frequency-energy-phase map. The DSP 138 or signal processor can analyze the acquired time-frequency-energy-phase maps and compare them with the known signal characteristics then classify the input signal mixture as comprising known signals. For the signals that cannot be classified, its signal characteristics will preferably be stored as a unique time-frequency-energy-phase map in a signal map library 140 with all other known signals. Hence, the identical signal can be classified if it exists in the signal mixture detected in the future. It is noteworthy that the SRO array 200 does not need to cover the entire frequency band of interest 106 due to the sparse signal nature of the input signals, which normally occupies less than 1/10 of the entire observed spectrum. A sparse signal is one that satisfies the Restricted Isometry Property (RIP) as defined in "Beyond nyquist: efficient sampling of sparse bandlimited signals," by J. A. Tropp, J. N. Laska, M. F. Duarte, J. K. Romberg, and R. G. Baraniuk, *IEEE Trans. on Information Theory*, vol. 56, pp. 520-544, 2010 which is incorporated by reference herein in its entirety. A separate control unit, which may exploit a compressive sensing (CS) algorithm, is used to determine the frequency-timing controls and reduce the number of SRO arrays. Consequently, it shrinks the SRO array hardware scale and leads to an efficient design. Such an unit is described as a CS-modified frequency-timing controller 110', shown in FIG. 10.

The performance of signal feature extraction can be degraded by the oscillator electrical performance, such as noise and jitter. Signal feature extraction is similar to signal classification in that it does not require a complete signal demodulation to acquire each demodulated data symbol. It needs to separate different signals within a signal mixture into each individual signal, which can be done by the prior art receivers noted above or preferably using the faster processing methods disclosed herein. The conversion from incoming signal energy to the oscillator start-up time reveals the representation can be disturbed by the oscillator noise induced by the oscillator tank and active devices. When there is no signal present in the frequency of the SRO 100, the SRO 100 has a start-up time of $\tau_{rise}$ log $[V_{osc}/V_n]$, which determines the SRO's sensitivity for signal energy acquisition. Because the SRO 100 is sensitive to the incoming signal only for a small fraction of each quench cycle at the beginning of build-up period, where the oscillator loop gain equals to unity, the noise is only sampled at that small time period. Similarly, the oscillator is also only sensitive to the noise in a small fraction of its period at the crossing point. Although SRO sensitivity and oscillator phase noise/jitter deteriorate by the oscillator noise in different mechanisms, they both are degraded by larger noise and the oscillator phase noise can be used to indirectly quantify the proposed oscillator sensitivity during signal energy acquisition.

Concurrently, the oscillator samples the input signal phase instantaneously at the oscillator start-up time. Because the phase produced by oscillators with phase noise is unstable, the oscillator phase could drift without bound and the phase noise could smear the oscillation tone and corrupt the sampled input signal phase information given long time. If the phase extraction time $\tau_{extract}$ is not very long away from the sampling point, the additional RMS phase noise can be calculated $$\varphi_n = \int_{1/\tau_{extract}}^{\infty} S_\varphi \, df,$$

as which has to be less than the desired phase resolution determined by the signal class. In conclusion, the oscillator phase noise/jitter deteriorates the extracted phase information and the far end phase noise ($>1/\tau_{extract}$) performance is more critical.

This concludes the description of the preferred embodiment of the present invention. The foregoing description of one or more embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. An apparatus for detecting amplitudes of signals in a frequency band or spectrum of interest, the apparatus comprising:
   at least one super-regenerative oscillator coupled to receive said signals, the super-regenerative oscillator having an adjustable center frequency and having a start-up time which is a function of either a strength of a received recognizable signal received via said antenna or of noise;
   a control circuit for adjusting the center frequency of the at least one super-regenerative oscillator as needed during successive time slots so that the at least one super-regenerative oscillator detects signals from said antenna over all of said radio frequency band or radio frequency spectrum of interest; and
   at least one envelope detector coupled to the at least one super-regenerative oscillator, the at least one envelope detector extracting said start of time of said at least one envelope detector during each successive time slot to thereby detect signals in all of said frequency band or spectrum of interest.

2. The apparatus of claim 1 wherein said control circuit selects the center frequency of the at least one super-regenerative oscillator according to a sparse selection algorithm.

3. The apparatus of claim 1 wherein the adjustable frequency of the at least one super-regenerative oscillator is selected at least periodically by said control circuit during time-wise adjacent time slots according to a segmentlet algorithm.

4. The apparatus of claim 1 wherein the at least one super-regenerative oscillator comprises an array of a plurality of super-regenerative oscillators and wherein the control circuit adjusts the center frequency of each of the super-regenerative oscillators in said array as needed during successive time slots so that said plurality of one super-regenerative oscillators in said array detects signals from said antenna over all of said radio frequency band or radio frequency spectrum of interest.

5. The apparatus of claim 4 wherein the adjustable frequency of said least some of the plurality of super-regenerative oscillators is changed at least periodically by said control circuit during time-wise adjacent time slots.

6. The apparatus of claim 5 wherein the adjustable frequency of each of said plurality of super-regenerative oscillators in said array is changed by said control circuit during at least one time slot.

7. The apparatus of claim 4 wherein the adjustable frequency of each of said plurality of super-regenerative oscillators is changed at least periodically by said control circuit during at least one time slot.

8. The apparatus of claim 4 wherein the adjustable frequency of each of said plurality of super-regenerative oscillators remains fixed during a majority of the time slots, but changes when the frequency band or spectrum of interest of changes.

9. The apparatus of claim 1 wherein the apparatus also detects phases of the recognizable signals in the frequency band or spectrum of interest, the apparatus further comprising at least one reference oscillator and at least one mixer, the at least one mixer being coupled to the at least one reference oscillator and to the at least one super-regenerative oscillator and at least one analog to digital convertor coupled to an output of the at least one mixer, the at least one analog to digital convertor providing detected phase information of the recognizable signals in the frequency band or spectrum of interest.

10. The apparatus of claim 4 wherein the apparatus also detects phases of the recognizable signals in the frequency band or spectrum of interest, the apparatus further comprising a plurality of reference oscillators and a plurality of mixers, each of the plurality of mixers being coupled to tone of said plurality of reference oscillators and to one of the plurality of super-regenerative oscillators and further comprising a plurality of analog to digital convertors each one of which is coupled to an output of a corresponding one of the plurality of mixers, the digital convertors collectively providing detected phase information of the recognizable signals in the frequency band or spectrum of interest.

11. The apparatus of claim 1 wherein the at least one super-regenerative oscillator has a bandwidth which covers only a portion of the frequency band or spectrum of interest, the received recognizable signal occurs within said bandwidth and near an adjustable center frequency of the at least one super-regenerative oscillator, at least the adjustable center frequency of the at least one super-regenerative oscillator being changed during said successive time slots.

12. A method of detecting amplitudes of recognizable signals in a frequency band or spectrum of interest, the method comprising:
dividing the frequency band or spectrum of interest into bandwidth segments of interest; and
detecting the presence of a signal having an amplitude in each bandwidth segment of interest by applying each bandwidth segment of interest to one or more super-regenerative oscillators and, if the one or more super-regenerative oscillators triggers to an ON state within a time slot, then determining the amplitude of a corresponding signal by measuring when the one or more super-regenerative oscillators triggers to its ON state within said time slot.

13. The method of claim 12 wherein phases of recognizable signals in the frequency band or spectrum of interest are also detected, the method further comprising: providing at least one reference oscillator and at least one mixer, the at least one mixer being coupled to the one or more reference oscillators and to the one or more super-regenerative oscillators and providing at least one analog to digital convertor coupled to an output of the at least one mixer, the at least one analog to digital convertor providing detected phase information of the recognizable signals in the frequency band or spectrum of interest.

14. A method of detecting amplitudes of recognizable input signals in a frequency band or spectrum of interest, the method comprising:
providing one or more super-regenerative oscillators, wherein each of the one or more super-regenerative oscillators has a center frequency and wherein each of the one or more super-regenerative oscillators detects amplitudes of recognizable input signals in the frequency band or spectrum of interest during multiple time slots;
varying the center frequency of each of the one or more super-regenerative oscillators between time slots;
whereby the one or more super-regenerative oscillators extract the amplitudes of each the recognizable input signals in different time slot and with a different time-slot associated center frequency, thereby providing a time-frequency-amplitude map of the frequency band or spectrum of interest.

15. The method of claim 14 further including delivering a plurality of said time-frequency-amplitude maps to a digital signal processor for characterization of the recognizable input signals in the frequency band or spectrum of interest.

16. The method of claim 14 further including comparing a time-frequency-amplitude characterization of each recognizable input signal in the frequency band or spectrum of interest with known time-frequency-amplitude characterizations of previously detected signals.

17. The method of claim 14 wherein phases of recognizable signals in the frequency band or spectrum of interest are also detected, the method further comprising: providing at least one reference oscillator and at least one mixer, the at least one mixer being coupled to the one or more reference oscillators and to the one or more super-regenerative oscillators and providing at least one analog to digital convertor coupled to an output of the at least one mixer, the at least one analog to digital convertor providing detected phase information of the recognizable signals in the frequency band or spectrum of interest, and providing time-frequency-amplitude-phase maps of the frequency band or spectrum of interest.

18. An apparatus comprising:
one or more super-regenerative oscillators for extracting amplitudes of signals in a received signal mixture using different time-slot associated center frequencies, thereby providing a time slot dependent frequency-amplitude characterization of said signals in said received signal mixture; and
a digital signal processor for classifying known signals in the received signal mixture by comparing the time slot dependent frequency-amplitude characterization of said signals in said received signal mixture with time slot dependent frequency-amplitude characterizations of known signals stored in a signal library.

19. The apparatus of claim 18 further including means for controlling bandwidths of said one or more super-regenerative oscillators and means for controlling center frequencies of each of said one or more super-regenerative oscillators.

20. The apparatus of claim 19 wherein the means for controlling bandwidths is an analog control signal having a selected slope.

21. The apparatus of claim 20 wherein the means for controlling center frequencies is an analog control signal for controlling a varactor coupled with each of said one or more super-regenerative oscillators or a digital control word for controlling a group of switched capacitors coupled with each of said one or more super-regenerative oscillators.

22. The apparatus of claim 20 wherein the means for controlling center frequencies of said one or more super-regenerative oscillators fixes each of said one or more super-regenerative oscillators to a different center frequency.

23. The apparatus of claim 18 wherein the apparatus also detects phases of the recognizable signals in the frequency band or spectrum of interest, the apparatus further comprising at least one reference oscillator and at least one mixer, the at least one mixer being coupled to the at least one reference oscillator and to the at least one super-regenerative oscillator and at least one analog to digital convertor coupled to an output of the at least one mixer, the at least one analog to digital convertor providing detected phase information of the recognizable signals in the frequency band or spectrum of interest.

24. The apparatus of claim 23 wherein the digital signal processor compares time slot dependent frequency-amplitude-phase characterization of the signals in the received signal mixture with time slot dependent frequency-amplitude-phase characterizations of known signals stored in said signal library.

\* \* \* \* \*